United States Patent [19]
Reichelt

[11] Patent Number: 5,869,813
[45] Date of Patent: Feb. 9, 1999

[54] PROCESS AND DEVICE FOR CHANGING THE TEMPERATURE OF A DISCRETE MATERIAL

[75] Inventor: Helmut Reichelt, Dresden, Germany

[73] Assignee: Dieter Broer, Germany

[21] Appl. No.: 793,202

[22] PCT Filed: Aug. 16, 1995

[86] PCT No.: PCT/DE95/01166

§ 371 Date: Feb. 18, 1997

§ 102(e) Date: Feb. 18, 1997

[87] PCT Pub. No.: WO96/05910

PCT Pub. Date: Feb. 29, 1996

[30] Foreign Application Priority Data

Aug. 18, 1994 [DE] Germany ............. 44 30 582.6

[51] Int. Cl.[6] ............................................. H05B 1/02
[52] U.S. Cl. .......................... 219/494; 219/502; 219/678
[58] Field of Search ................................. 219/494, 502, 219/678, 687, 744

[56] References Cited

U.S. PATENT DOCUMENTS

| 1,918,388 | 7/1933 | Esau . | |
|---|---|---|---|
| 2,370,161 | 2/1945 | Hansen . | |
| 3,578,968 | 5/1971 | Hellwig | 250/41.3 |
| 4,052,139 | 10/1977 | Paillaud . | |
| 4,434,345 | 2/1984 | Muscatell . | |
| 4,590,348 | 5/1986 | Lahtl et al. . | |
| 5,077,461 | 12/1991 | Hasegawa | 219/553 |

FOREIGN PATENT DOCUMENTS

| OS2512694 | 9/1970 | Germany . |
|---|---|---|
| DD2286012 A5 | 7/1981 | Germany . |
| OS3017422 A1 | 11/1981 | Germany . |
| 2098088 | 11/1982 | United Kingdom . |

Primary Examiner—Mark H. Paschall
Attorney, Agent, or Firm—William D. Lee, Jr.; Cort Flint

[57] ABSTRACT

The invention calls for a discrete material (1) such as a gas, a liquid or a living being, to be exposed to electromagnetic radiation from a large-area irradiator (2) causing the molecules to resonate at their natural frequency and hence to become warmer. In order to lower the temperature of the material (1), the radiant energy emitted by its is extracted via a receive antenna (5), resulting in a loss in energy and hence cooling of the material. Working in an enclosed fluid-filled space, the fluid can also be included, by suitable choice of radiation spectrum, in the resonance interaction producing the warming or cooling effect.

8 Claims, 2 Drawing Sheets

PROCESS AND DEVICE FOR CHANGING THE TEMPERATURE OF A DISCRETE MATERIAL

FIELD OF THE INVENTION

This invention relates to a process and to a device to change the temperature of a discrete material. It can be used with all technical processes linked to a change of temperature and, as a result, the losses and the expenditures in energy and material occurring in the known processes to change the temperature of a discrete material can be reduced. In the present invention discrete material is understood to be a material with natural molecular and/or atomic frequencies, e.g., liquids, gases or living beings.

BACKGROUND

Many processes and devices to change the temperature of a discrete material by means of electromagnetic radiation are known.

Microwave ovens used as devices to warm, cook or broil food by means of microwave heating are generally known. This is a dielectric heating of electrically non-conductive materials by energy transposition in a spatially concentrated microwave field. For this, a hollow-space resonator, if necessary, with the addition of suitable reflectors, is used to concentrate the microwave radiation. For such microwave heating wave lengths in a range from 1 cm to 10 cm corresponding to frequencies of 3 to 30 Ghz ($10^9$Hz) are used. Commercially available microwave ovens are operated at a frequency of 2.450 MHZ [12-cm band]. Such microwaves are known to be dangerous and damaging to humans, in particular to the eyes, so that safety regulations exist for microwave ovens limiting any radiation leaks. Such devices are, therefore, not suited for room heating in particular and, their operating frequency is clearly under characteristic molecular natural frequencies.

Furthermore, a process to heat material by means of an antenna and electromagnetic radiation is known (U.S. Pat. No. 2 370 161; FIG. 10). In this patent a spatially arranged antenna structure is used. An antenna part is here connected to the feeder of a generator while another antenna part, separated from it in space, is connected to the other feeder of the generator. Between these antennas or in the space delimited thereby, a resonance condition is produced with the use of ultra-high frequency waves, i.e. in a frequency range corresponding to the range of the decimeter waves. This wave range is far removed from the considerably higher natural molecular frequencies. Outside the space delimited by the antenna parts no heating is possible, in particular, no heating occurs within the one-sided radiation of an antenna part.

Furthermore, a process for cooling and for creating electron energy by means of a cyclic process of electron gas in known (DD, A, 286 012). This process allows for effective cooling, however, not for the heating of a discrete material. In the process desired, resonance modulation within a geometrically defined space from which energy is to be withdrawn occurs. This process functions with a high-frequency carrier frequency as well as with a low frequency modulation, whereby modulation increase up to the transmitter amplitude causes heat and radiant energy to be withdrawn by means of the electron-gas cyclic process from the geometrically defined space designed for resonance conditions. This process is relatively expensive due to the geometric constraints of the space and the required modulations. A material placed in the space would be cooled only by means of space cooling but not directly.

A device making available inner energy of a material quantity is also known (DE-OS 3 017 422). In this case changes of the energy level in the molecular linkages are produced in an enclosed space of special form by the exciting radiation fed in form of coherent, impulse-modulated electromagnetic radiation. Here, the exciting rays fed in the form of laser rays must arrive at a certain angle which depends on the special form of the enclosed space. Furthermore the space must allow for total reflection of the exciting rays and the heat generated in the enclosed space must be removed via a heat exchanger. This device has the disadvantage that only a small quantity of energy can be transposed and that in addition losses occur, caused by the heat exchanger.

DE-OS 25 12 694 describes a process for the modification of the space-time geometry of a discrete material and DE-OS 25 12 694 a device for the modification of space-time geometry acting upon a discrete mass. In both, water, for example, is mentioned as a discrete material. It is the object of the present invention to create a process and a device for changing the temperature of a discrete mass, whereby greater efficiency is achieved by simple means.

It is in particular also an object of the invention to create a process and a device suitable for the heating of living space.

SUMMARY OF THE INVENTION

The above objects are accomplished according to the present invention wherein, for heating, a process is used in which a frequency within the range of the natural molecular frequency of a discrete material is emitted by means of a surface irradiator, whereby the natural molecular oscillations of the discrete material are caused to resonate, resulting in an increase of the material's temperature. The generally used second resonator element is superfluous in this instance. The discrete material to be heated is brought within radiation zone of the irradiator and thereby the resonance of the natural molecular oscillations is produced in the discrete material, resulting in heating the latter.

On the other hand, in order to lower the temperature of the discrete material, an electromagnetic radiation is emitted by an irradiator at a frequency which is in the order of magnitude of the natural molecular frequency of said discrete material to be cooled. The discrete material to be cooled is brought within the radiation range of the irradiator, and thereby in the discrete material a resonance of the natural molecular oscillations is produced. The radiant energy emitted by the discrete material oscillating in resonance is received by a receiving antenna and is diverted, resulting in a transfer of heat energy and a resulting cooling to the material In placing the device in a closed, medium-filled enclosed space, a suitable selection of the radiation spectrum can also include the selection of the medium for heating or cooling in the resonance alternation effect.

The device for heating a discrete material consists of a radiator delimited on both sides by feeders made of a material with high electrical conductivity and of a generator for the production of the radiant energy, connected to the feeders. The material to be heated is placed within radiation range of the irradiator.

The device to cool a discrete material consists of an irradiator, of a first and a second feeder made of a material that is electrically highly conductive, of an antenna delimited on one side by one of the feeders and on the other side by a similar antenna delimiter, of a generator connected to the feeders for the production of the radiant energy, of a consumer positioned between the antenna delimiter and one of the feeders, of a capacitor positioned between the generator and one of the feeders. The discrete material can be placed within the radiation range of the irradiator, The irradiator is advantageously designed with large surfaces and is delimited by the feeders which are advantageously parallel to each other and separated by a distance which is advantageously a whole-number multiple of the wavelength radiated by the irradiator.

When using the device in a defined enclosed space filled with a liquid or gaseous medium it may be advantageous for the frequency emitted by the irradiator to be within the range of the natural molecular frequency of the discrete material as well as of the medium which is present in the enclosed space, so that the latter may also be included in the process of temperature modification.

The alternating effect of the irradiator and the material in the range of resonance frequency of the natural molecular frequency achieves an effectiveness which is not possible, in particular, with known time systems.

DESCRIPTION OF THE DRAWINGS

The construction designed to carry out the invention will hereinafter be described, together with other features thereof.

Examples of embodiments of the invention are explained in greater detail through the drawings in which.

DETAILED DESCRIPTION

Figure 1:
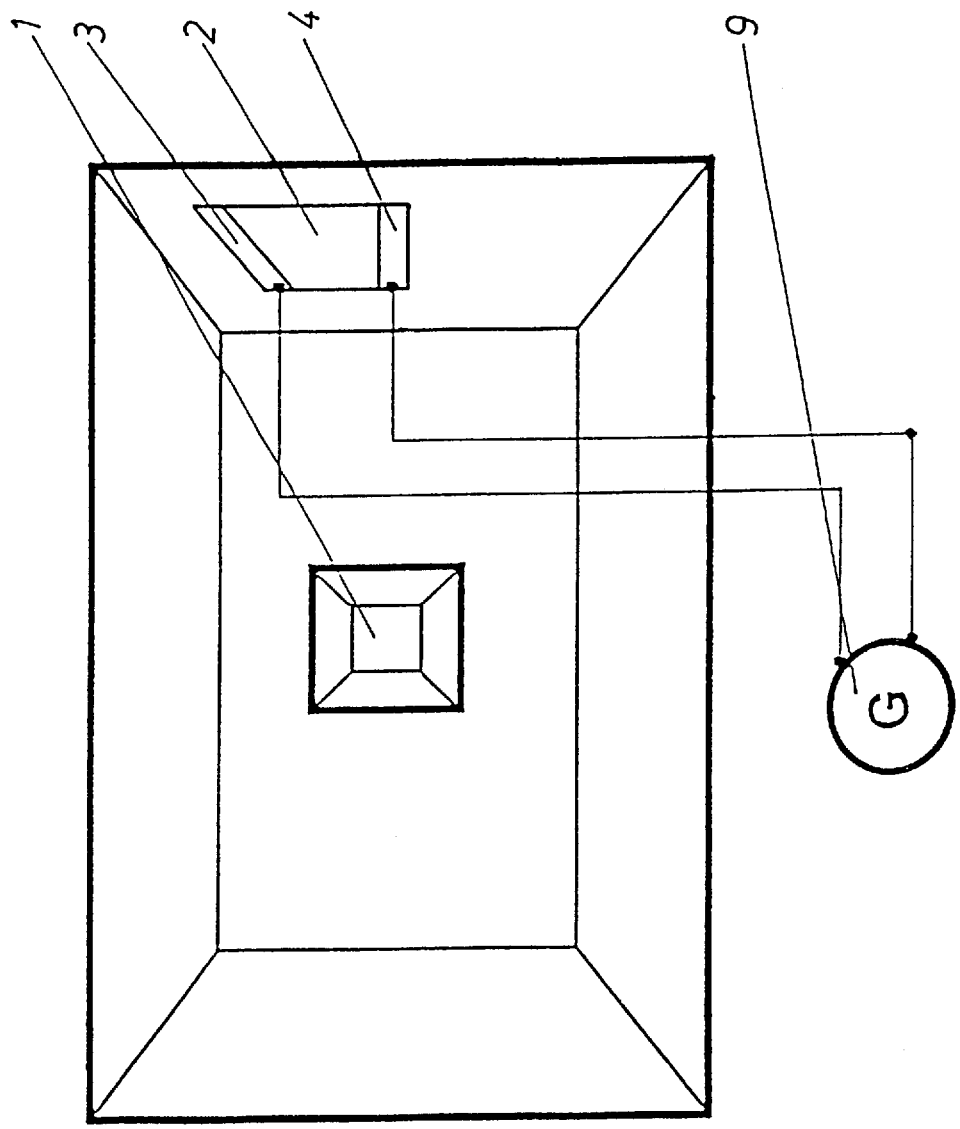
FIG. 1 is schematic representation of an arrangement to heat a discrete material; and, FIG. 2 is schematic representation of an arrangement to cool a discrete material.

Referring now to the drawings, the invention will now be described in more detail.

FIG. 1 shows an enclosed space in which a discrete material 1, e.g. a living being, is present within the radiation range of a irradiator 2 which is delimited by an upper and by a lower feeder 3 and 4. The distance between the parallel feeders 3 and 4 which are made of a highly conductive material is advantageously a whole-number multiple of the wavelength of the transmitter frequency. Through these feeders 3 and 4 the energy generated by the generator 9 for the emission of the high-frequency electromagnetic rays at a frequency in the order of magnitude of the natural molecular frequency of the discrete material is supplied to the irradiator 2.

The large-surface irradiator 2 radiates this electromagnetic radiation upon the discrete material 1 and causes resonance of the natural molecular oscillations in the discrete material 1.

This results in an almost inertia-free heating of the discrete material 1 since few losses occur in the transmission of energy by transmission media and since the discrete material heats up due to the increased natural molecular oscillations.

If the device is located in an enclosed, media-filled space, an appropriate selection of the radiation spectrum can result also in inclusion of the medium into the resonance alternation effect, and this also leads to a heating of the medium in addition to the discrete material.

Figure 2:
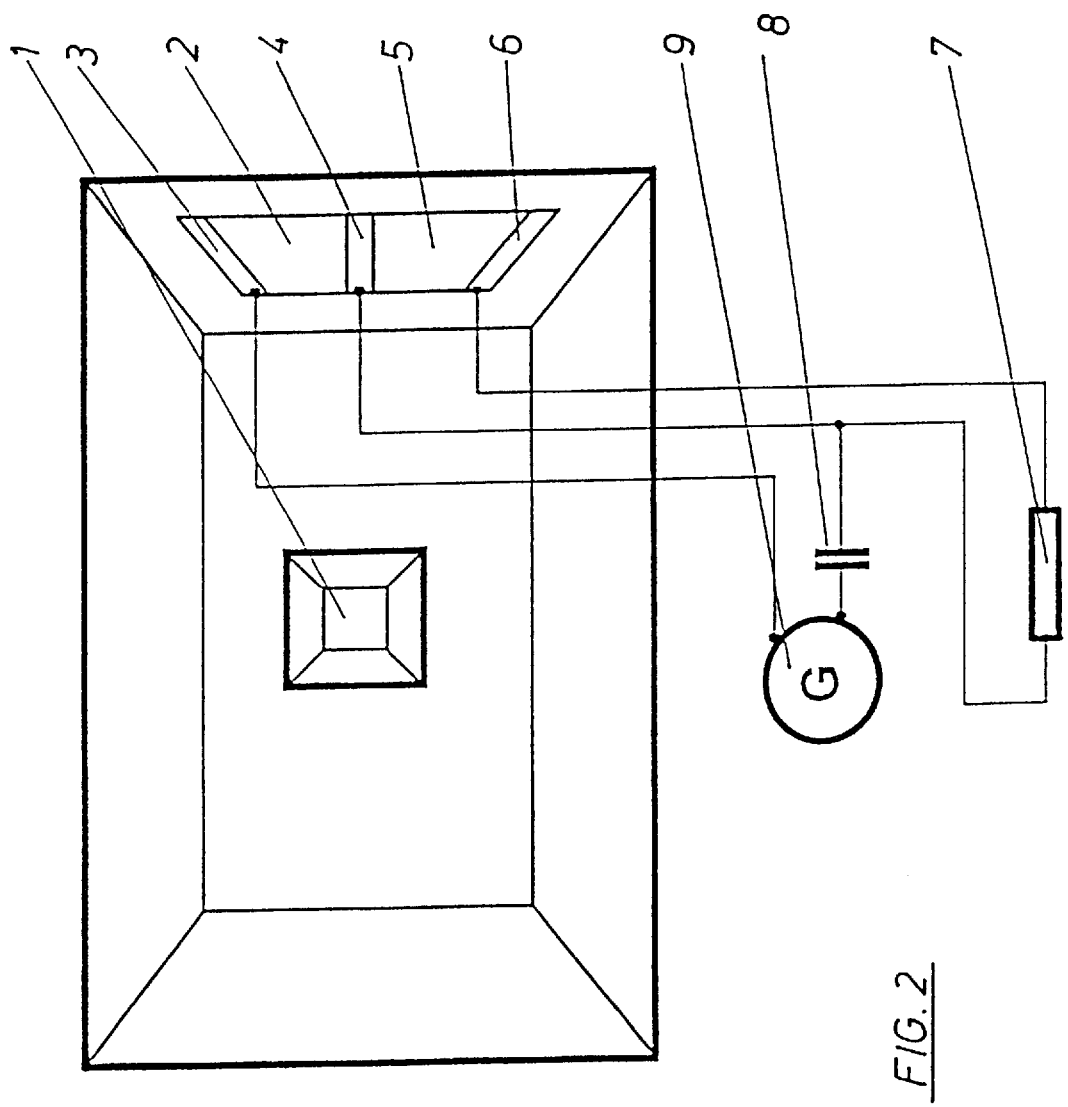

FIG. 2 shows an arrangement for the cooling of the discrete material 1. For this, an antenna 5 is provided in addition to the arrangement of FIG. 1, said antenna being also given large surfaces and being delimited on one side by the feeder 4 and on the other side by an antenna delimiter 6 of the same type, these being parallel to each other and placed at a distance from each other equal to a whole-numbered wavelength multiple. With this arrangement it is possible to remove energy from the system and thereby from the discrete material 1. The radiation emitted by the discrete material 1 which oscillates in resonance is received by the antenna 5 and is conveyed via feeder 4 and antenna delimiter 6 to a consumer 7, whereby the generator 9 is separated capacitatively from the consumer 7 by a capacitor 8.

As a result of this energy emission, a lowering of the temperature can be achieved in the discrete material 1 as well as in the surrounding medium, since the electromagnetic radiation emitted at resonance amplitude contains more energy then the exciting frequency which may have a relatively low amplitude.

What is claimed is:

1. A process for changing the temperature of a discrete material wherein the material is heated comprising the steps of:

a) providing an electromagnetic energy generator and large-surface irradiator therefor;

b) determining the natural molecular vibration frequency of said discrete material;

c) emitting electromagnetic radiation by said large-surface irradiator at a frequency which is in the order of magnitude of the natural molecular vibrations of said discrete material to be heated, said frequency not being a modulated carrier frequency;

d) bringing the discrete material to be heated within the radiation range of said irradiator; and, e) producing a resonance of the natural molecular oscillations of said discrete material in order to heat the latter.

2. A process according to claim 1 including the step of placing said irradiator in an enclosed space filled with a medium in addition to said discrete material and selecting a suitable radiation spectrum which includes also a resonance frequency of said medium for the purpose of heating.

3. A process for changing the temperature of a discrete material wherein the discrete material is cooled comprising the steps of:

a) emitting from a large-surface irradiator electromagnetic radiation at a frequency which is in the order of magnitude of the natural molecular vibrations of said discrete material to be cooled, this frequency not being a modulated carrier frequency;

b) bringing said discrete material to be cooled within the radiation range of the irradiator;

c) producing a resonance of the normal molecular oscillations in the discrete material; and, d) receiving the radiation energy emitted by the discrete material oscillating in resonance by said large-surface receiver antenna and diverting said energy.

4. A process as in claim 3 including the steps of providing an enclosure around said antenna and discrete material, and filling the enclosure with a medium, said medium having a resonance selected for cooling said medium.

5. A device to carry out the process for changing the temperature of a discrete material as in claim 3 comprising:

a) a large-surface irradiator with a first and a second feeder made of a material with high electrical conductivity;

b) a large-surface receiving antenna which is delimited on one side by one of said feeders and on the other side by a third antenna delimiter;

c) a generator connected to said one feeder for the production of the radiation energy;

d) a consumer intercalated between the third antenna delimiter and said one feeder;

e) a capacitor intercalated between the generator and said one feeder; and, f) a discrete material which can be brought within the radiation range of the irradiator.

6. A device as in claim 5 characterized in that the irradiator is delimited by said feeders which are parallel relative to each other and at a distance from each other which is a whole-number multiple of the wavelength emitted by the irradiator, and in that the receiving antenna is delimited on the one side by one of said feeders of the irradiator and on the other side by the third antenna delimiter, these being advantageously parallel relative to each other and at a distance from each other which is a whole-number multiple of the wavelength emitted by the irradiator.

7. A device for modifying the temperature of a discrete material comprising:

a) a large-surface irradiator which is delimited on one side by a first feeder and on the other side by a second feeder made of a material with high electrical conductivity, said feeders being relatively parallel to each other and at a distance from each other which is a whole number multiple of the wavelength emitted by the transmitting antenna; and, b) a generator connected to said feeders for the production of electromagnetic radiant energy, whereby said discrete material to be heated can be positioned within the radiation range of said irradiator.

8. A device as in claim 7 including an enclosure having a medium therein selected from the group consisting of liquids and gases characterized in that the frequency emitted by said irradiator is within the range of the normal molecular frequency of the discrete material of the medium located in said enclosure.

* * * * *